T. A. EDISON.
MEANS AND METHOD FOR PREVENTING DEPLETION OF ELECTROLYTE.
APPLICATION FILED JUNE 21, 1911.
1,016,874.
Patented Feb. 6, 1912.
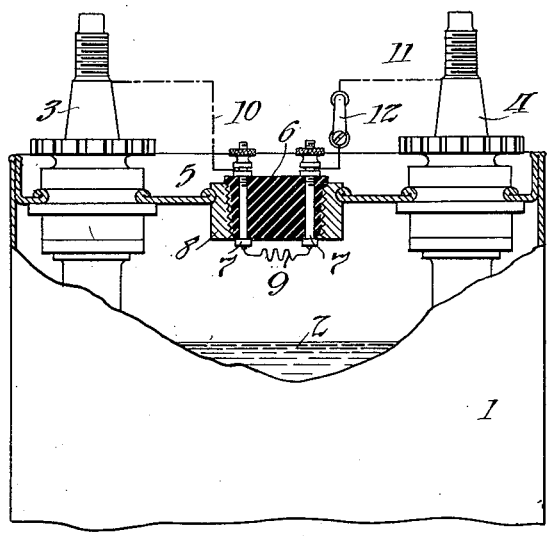

UNITED STATES PATENT OFFICE.

THOMAS A. EDISON, OF LLEWELLYN PARK, NEW JERSEY, ASSIGNOR TO EDISON STORAGE BATTERY COMPANY, OF WEST ORANGE, NEW JERSEY, A CORPORATION OF NEW JERSEY.

MEANS AND METHOD FOR PREVENTING DEPLETION OF ELECTROLYTE.

1,016,874.  Specification of Letters Patent.  Patented Feb. 6, 1912.

Application filed June 21, 1911. Serial No. 634,424.

*To all whom it may concern:*

Be it known that I, THOMAS A. EDISON, a citizen of the United States, and a resident of Llewellyn Park, county of Essex, and State of New Jersey, have invented certain new and useful Improvements in Means and Methods for Preventing Depletion of Electrolyte, of which the following is a description.

My invention relates to a method for preventing the depletion of the electrolyte in a secondary cell or storage battery, by the escape of gases evolved during the charging of the cell, and to effective means for carrying out the said method.

When the storage battery cell is charged, hydrogen and oxygen gases are given off by the decomposition of the electrolyte and are in present practice allowed to escape. In alkaline storage batteries of the Edison type the potassium hydroxid of the electrolyte is carried away to some extent by the bubbles of gas and in the case of the "lead type" of storage battery, the sulfuric acid is similarly carried away. This results in either case in the depletion of the electrolyte and in other harmful effects, such as the deposits of the acid or the alkaline hydroxid on the outside of the cells. By my invention these faults are obviated, and the necessity of replenishing the electrolyte done away with. To accomplish these results, I propose to prevent the escape from the storage battery cell of the gases evolved and to cause the same to recombine as formed or periodically within the cell, to form water and automatically regenerate the electrolyte. By my method, the oxygen and hydrogen formed are caused to mingle and to explosively combine by the application of a sufficient amount of heat within the gas space of the battery cell, or in a chamber connected with the cell.

In present practice, as stated, the gases evolved are permitted to escape from the cell when they have attained sufficient pressure. When the active material of the electrodes in the cell becomes exposed to the gases accumulated in the space above the level of the electrolyte in the cell because of the depletion of the electrolyte, internal explosions are apt to occur. These are caused by the combination of the oxygen and hydrogen which may be due to the rapid oxidation of the active material of the electrodes, as the latter become dry, with resultant heat. Such explosions are harmful because the burning gases escape from the cell at high heat with the danger of causing other explosions outside of the cell. If the exploding mixture were not allowed to escape, the force thereof might be sufficient to disrupt or distort the containing can. By my process, I cause the combination of the oxygen and hydrogen to take place at shorter intervals and therefore before the quantity of the gases evolved has become sufficient to render the internal explosions dangerous. By this means, the electrolyte is constantly replenished and its level is maintained sufficiently high to prevent the exposure of the active material of the grids.

In order that a clearer understanding of my invention may be had, attention is hereby directed to the accompanying drawing forming part of this specification and illustrating one form of apparatus by which my process may be carried into effect.

The drawing illustrates a storage battery cell of the Edison type broken away, partly in side elevation and partly in section, and provided with means of the character referred to.

Referring to the drawing, the storage battery cell comprises a receptacle 1 containing an electrolytic solution 2 which may be potassium hydroxid. The cell is provided with positive and negative electrodes, (not shown), which are connected respectively with the binding posts or terminals 3 and 4 which extend upwardly through the top 5 of the cell. A member 6 of insulating material is mounted in the top of the cell and carries a pair of conductors such as the bolts 7—7, extending therethrough. As illustrated, the insulating plug 6 may be provided with screw thread and screwed into a block 8 which is mounted in the top 5. The top 5 is crimped into close contact with the binding posts and the block 8 to render the cell gas-tight. The lower ends of bolts 7 within the cells are connected by a coil of platinum wire 9 and the upper ends of bolts 7 are connected respectively by conductors 10 and 11 to the binding posts 3 and 4. A switch 12 may be interposed in the circuit as between the conductor 7 and the terminal 4.

By these means a circuit is completed between the binding posts of the cell including the wire 9, which, upon the charging of the cell will be highly heated by the passage of current therethrough and will ignite the gases evolved by decomposition of the electrolyte as often as a small quantity thereof have been formed. The wire 9 may be protected from the splashing of the electrolyte in any desired manner, as by a wire screen, (not shown).

Instead of using a wire heated by current as described, I may use oxid of platinum or finely divided platinum in the form of small wires or the well known platinum sponge, to automatically ignite the gases formed. It is well known that platinum in such form will ignite an inflammable gas. The platinum oxid or finely divided platinum may either be included in electrical circuit, as illustrated, or may be caused to ignite the gases without electrical connection, by impact of the gases thereof, if it is properly protected against moisture. The hydrogen and oxygen mingle intimately together within the pores of the platinum sponge so as to ignite very readily if they are sufficiently dry. The gas igniting device, such as the platinum sponge, may be placed in a chamber connecting with the gas space of the cell, if desired, so as to prevent the same being cooled by the spray of the electrolyte while the cell is being charged. If desired, the explosion chamber or the passage leading thereto, may be heated externally or in any desired manner, to dry the gases before the same come in contact with the ignition device to facilitate the combination.

It is obvious that my invention is not limited to the exact means shown or described but that I am entitled to any fair equivalents thereof whereby my process may be carried out, it only being requisite that the gases evolved are not permitted to escape, and that means are provided for causing the hydrogen and oxygen generated to combine by application of sufficient heat to form water which will fall back into or can be led back into the electrolytic solution, to obviate the waste of solution and chemicals of the present practice with the resulting evils referred to.

Having now described my invention what I claim as new and desire to protect by Letters Patent is:—

1. The method of preventing depletion of electrolyte in a secondary cell which consists in preventing the escape from the cell of the gases evolved during the charging of the same, and causing the oxygen and hydrogen evolved to recombine within the cell to form water, by application of sufficient heat to cause such recombination within the space occupied by said gases during the formation thereof.

2. The method of preventing depletion of electrolyte in a secondary cell which consists in producing sufficient heat within the space occupied by gases evolved during the charging of a cell, by decomposition of the electrolyte, to cause the recombination of the oxygen and hydrogen to form water, and causing the same to reënter the electrolyte solution.

3. The method of preventing depletion of electrolyte in a secondary cell which consists in causing the conversion of electrical energy into heat, within a confined space connected with the electrolyte of a secondary cell during the charging of the cell, the heat generated being sufficient to cause the combination of oxygen and hydrogen evolved from the electrolyte to reform water.

4. In a secondary cell, the combination with the closed containing vessel, and terminals, of an electrical connection across said terminals including a member mounted within the gas-space of the said cell and adapted to be heated by passage of current therethrough to a temperature above that at which oxygen and hydrogen combine to form water.

5. In a secondary cell, the combination with the closed containing vessel having a space in which gas is adapted to collect during the charging of the cell, of a member positioned in said space and adapted to give off heat during the evolution of oxygen and hydrogen in the cell, sufficient to cause the combination of the same to form water.

This specification signed and witnessed this 16th day of June 1911.

THOS. A. EDISON.

Witnesses:
HENRY LANAHAN,
ANNA R. KLEHM.

It is hereby certified that in Letters Patent No. 1,016,874, granted February 6, 1912, upon the application of Thomas A. Edison, of Llewellyn Park, New Jersey, for an improvement in "Means and Methods for Preventing Depletion of Electrolyte," an error appears in the printed specification requiring correction as follows: Page 1, line 27, for the word "deposits" read *deposit;* and that the said Letters Patent should be read with this correction therein that the same may conform to the record of the case in the Patent Office.

Signed and sealed this 5th day of March, A. D., 1912.

[SEAL.]

C. C. BILLINGS,
*Acting Commissioner of Patents.*